US012583726B2

(12) United States Patent
Snider et al.

(10) Patent No.: US 12,583,726 B2
(45) Date of Patent: Mar. 24, 2026

(54) MOUNTING FLANGE

(71) Applicant: Zephyr Ventilation LLC, Alameda, CA (US)

(72) Inventors: Jeremy Snider, Alameda, CA (US); I-Hsuan Chang, Taiwan (CN)

(73) Assignee: Zephyr Ventilation LLC, Alameda, CA (US)

( * ) Notice: Subject to any disclaimer, the term of this patent is extended or adjusted under 35 U.S.C. 154(b) by 58 days.

(21) Appl. No.: 18/417,064

(22) Filed: Jan. 19, 2024

(65) Prior Publication Data

US 2024/0246806 A1 Jul. 25, 2024

Related U.S. Application Data

(60) Provisional application No. 63/481,451, filed on Jan. 25, 2023.

(51) Int. Cl.
*B67D 1/06* (2006.01)
*B67D 1/14* (2006.01)

(52) U.S. Cl.
CPC ............. *B67D 1/06* (2013.01); *B67D 1/1405* (2013.01)

(58) Field of Classification Search
CPC ................................ B67D 1/06; B67D 1/1405
USPC .................................................. 222/160, 173
See application file for complete search history.

(56) References Cited

U.S. PATENT DOCUMENTS

| | | | | |
|---|---|---|---|---|
| 2,871,675 A * | 2/1959 | Cornelius | F25D 3/04 | 62/390 |
| 3,861,568 A * | 1/1975 | Morris | A47K 5/12 | 222/173 |
| 5,482,089 A * | 1/1996 | Weber | F01N 13/1816 | 138/121 |
| 2008/0178957 A1* | 7/2008 | Thomas | F16L 25/0036 | 138/123 |
| 2011/0108240 A1* | 5/2011 | Bax | F25D 31/002 | 165/104.19 |
| 2017/0327368 A1* | 11/2017 | Arora | B67D 1/0867 | |

* cited by examiner

*Primary Examiner* — David J Walczak
(74) *Attorney, Agent, or Firm* — Hansen Reynolds LLC

(57) ABSTRACT

A mounting flange having an insert with an exposed flange, an insert channel wall extending from the exposed flange, the channel wall defining an inner surface and an outer surface; and an anchor with an anchor flange, an anchor channel wall extending from the anchor flange, the channel wall defining an inner surface and an outer surface. One of the inner surface and outer surface of the insert channel wall defines a plurality of teeth and one of the inner surface and outer surface of the anchor channel wall defines a plurality of teeth for threaded engagement with the teeth defined on the insert channel wall.

18 Claims, 6 Drawing Sheets

MOUNTING FLANGE

PRIORITY CLAIM

This application claims benefit under 35 U.S.C. § 119(e) to U.S. Provisional Application Ser. No. 63/481,451, filed Jan. 25, 2023, which is expressly incorporated by reference herein and made a part hereof.

BACKGROUND

The present disclosure relates to a mounting flange for mounting structures to a surface. More particularly, the present disclosure relates to a mounting flange for mounting structures to a countertop. In one embodiment, the present disclosure relates to a mounting flange for mounting a drink dispensing tower to a countertop such as a beer tap.

SUMMARY

A mounting flange having an insert with an exposed flange, an insert channel wall extending from the exposed flange, the channel wall defining an inner surface and an outer surface; and an anchor with an anchor flange, an anchor channel wall extending from the anchor flange, the channel wall defining an inner surface and an outer surface. One of the inner surface and outer surface of the insert channel wall defines a plurality of teeth and one of the inner surface and outer surface of the anchor channel wall defines a plurality of teeth for threaded engagement with the teeth defined on the insert channel wall.

A mounting flange comprising an insert having an exposed flange, an insert channel wall extending from the exposed flange, the channel wall defining an inner surface and an outer surface, and an anchor having an anchor flange, an anchor channel wall extending from the anchor flange, the channel wall defining an inner surface and an outer surface. One of the inner surface and outer surface of the insert channel wall defines a plurality of teeth and one of the inner surface and outer surface of the anchor channel wall defines a plurality of teeth for threaded engagement with the teeth defined on the insert channel wall. The exposed flange can define a plurality of mounting holes. The mounting flange can have an insulation tube comprising an upper flange, a lower flange and a body extending between the upper flange and the lower flange. The insulation tube body can define a plurality of ridges providing flexibility to the body. The insulation tube body can be located inside the anchor channel wall.

A mounting kit comprising an insulation tube, and a mounting flange having an insert having an exposed flange, an insert channel wall extending from the exposed flange, the channel wall defining an inner surface and an outer surface, an anchor having an anchor flange and an anchor channel wall extending from the anchor flange, the channel wall defining an inner surface and an outer surface. One of the inner surface and outer surface of the insert channel wall defines a plurality of teeth and one of the inner surface and outer surface of the anchor channel wall defines a plurality of teeth for threaded engagement with the teeth defined on the insert channel wall. The exposed flange can define a plurality of mounting holes. The insulation tube can comprise an upper flange, a lower flange, and a body extending between the upper flange and the lower flange. The body can define a plurality of ridges providing flexibility to the body. The insulation tube body can be located inside the anchor channel wall. The mounting kit can also have a gasket.

An insulation tube for insulating a transition between a tap tower and a cooler, the insulation tube including an upper flange, a lower flange and a body extending between the upper flange and the lower flange. The body can define a plurality of ridges providing flexibility to the body.

A liquid dispensing tower mounting kit comprising a tap tower, an insulation tube, and a mounting flange having an insert having an exposed flange and an insert channel wall extending from the exposed flange, the channel wall defining an inner surface and an outer surface; an anchor having an anchor flange and an anchor channel wall extending from the anchor flange, the channel wall defining an inner surface and an outer surface. One of the inner surface and outer surface of the insert channel wall defines a plurality of teeth and one of the inner surface and outer surface of the anchor channel wall defines a plurality of teeth for threaded engagement with the teeth defined on the insert channel wall. The exposed flange can define a plurality of mounting holes. The insulation tube can have an upper flange, a lower flange, and a body extending between the upper flange and the lower flange. The body can define a plurality of ridges providing flexibility to the body. The body can be axially flexible. The body can be located inside the anchor channel wall. The mounting kit can further comprising a gasket.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1A:
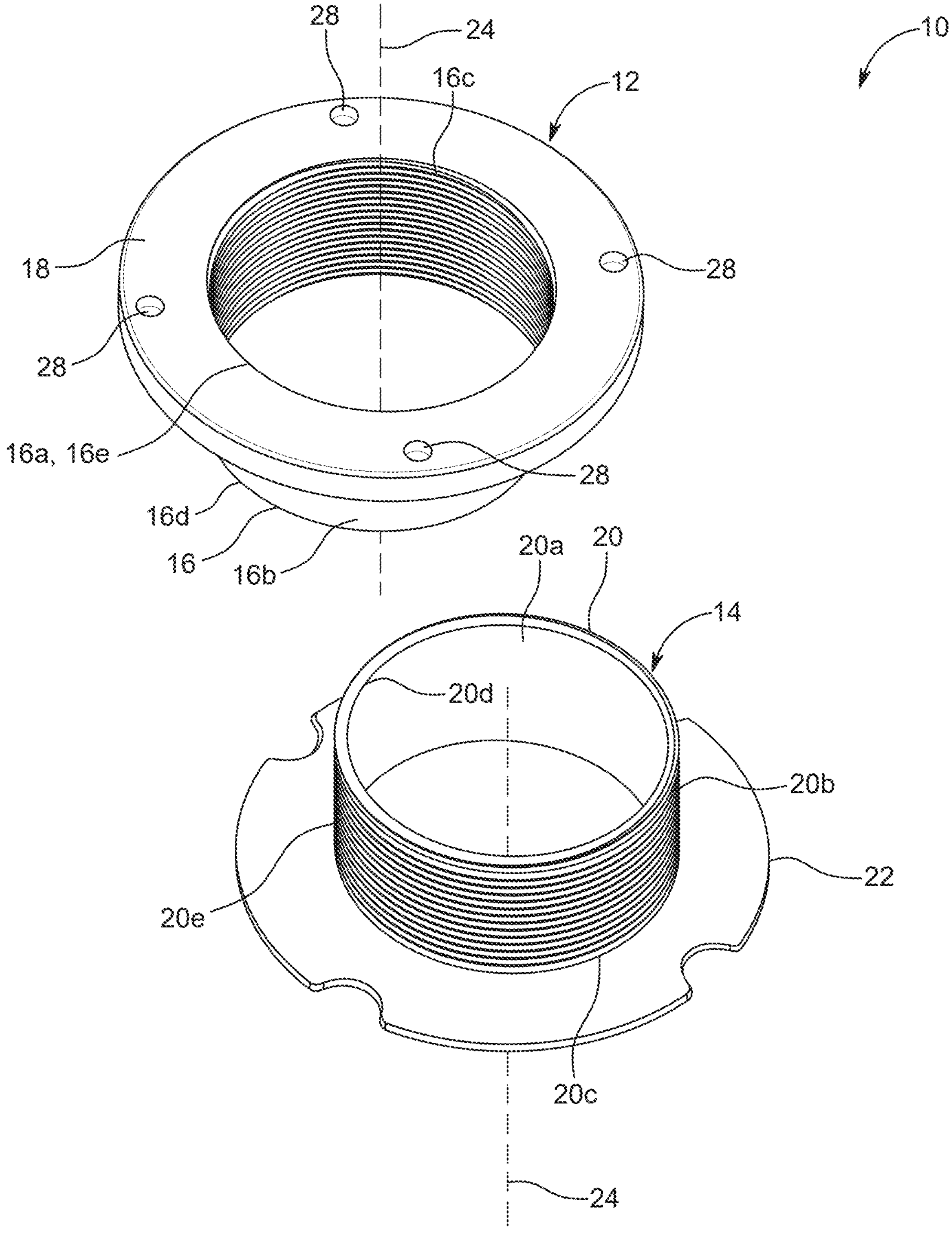
FIG. 1A is a perspective view of the mounting flange of the present invention.
Figure 1B:
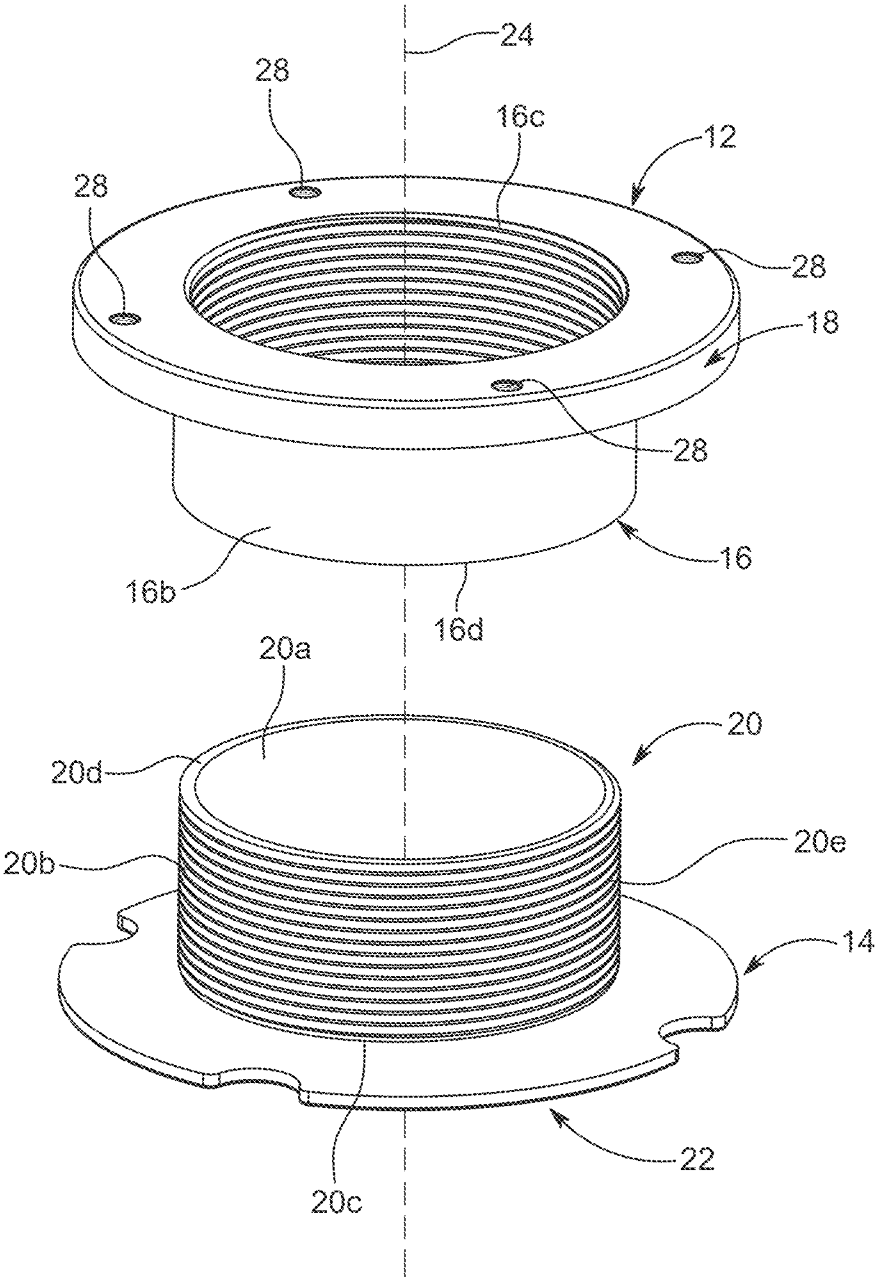
FIG. 1B is a second perspective view of the mounting flange of FIG. 1A.

A mounting flange 10 is depicted in FIGS. 1A and 1B having an insert 12 and an anchor 14. The insert 12 has a channel wall 16 and an exposed flange 18 extending outward from the insert channel wall 16. The anchor 14 has a channel wall 20 and an anchor flange 22 extending outward from the anchor channel wall 20. The insert channel wall 16 and the anchor channel wall 20 are depicted as circular cylindrical walls defining a channel axis 24, but other shapes are also contemplated.

The insert channel wall 16 defines in inner surface 16*a* and an outer surface 16*b*. The insert channel wall 16 also defines a flange end 16*c* and a free end 16*d*. The exposed flange 18 extends radially outward from the flange end 16*c* of the insert channel wall 16. Similarly, the anchor channel wall 20 defines an inner surface 20*a* and an outer surface 20*b* as well as a channel wall flanged end 20*c* and a free end 20*d*. The anchor flange 22 extends radially outward from the anchor channel wall flanged end 20*c*.

The insert channel wall inner surface 16*a* defines insert threads 16*e* and the anchor channel wall outer surface 20*b* defines mating anchor threads 20*e*. The diameters of the insert threads 16*e* and the anchor threads 20*e*, as well as their associated wall surfaces 16*a*, 20*b* on which they are defined, as sized to allow the insert 12 and anchor 14 to be threaded to one another.

Figure 2B:
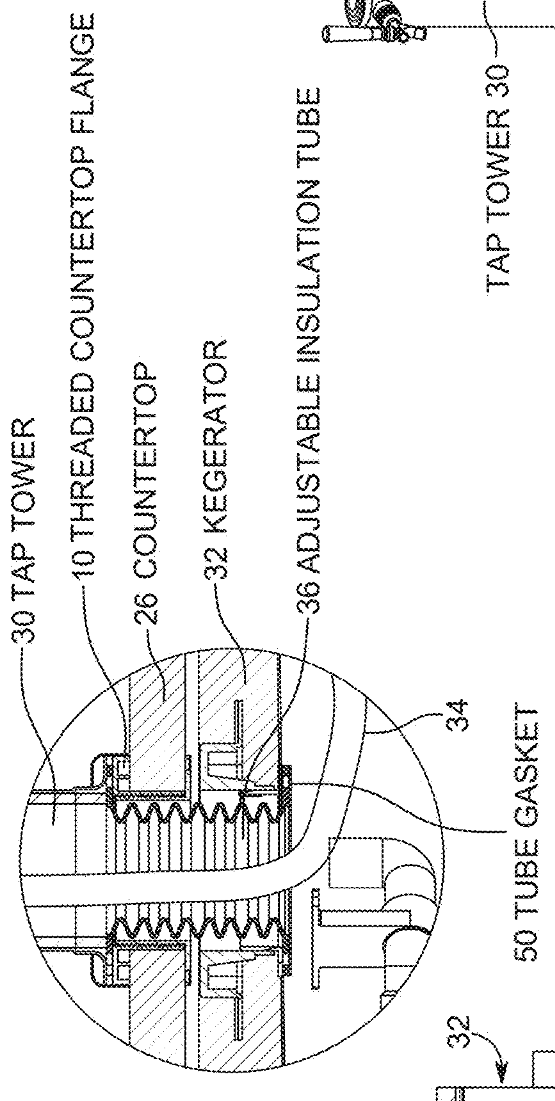
FIG. 2B is an enlarged view of a portion of FIG. 2A.

FIG. 2B depicts one possible application of the mounting flange 10 (identified in the Figure as a "Threaded Countertop Flange"). As depicted, the insert 12 is inserted into a top side of an aperture defined in a countertop 26 with the insert channel wall outer surface 16*b* approximately the diameter of the countertop aperture. The anchor 14 is also inserted in the aperture define in the countertop 26. The insert 12 and the anchor 14 are screwed to one another to secure the mounting flange 10 to the countertop 26. The exposed flange 18 of the insert 12 and the anchor flange 22 of the anchor 14 each are pressed into the countertop 26 as the insert 12 and anchor 14 are advanced toward one another with the threads 16*e*, 20*e*. By sufficiently advancing the insert 12 and anchor 14 toward one another and, optionally, deforming the exposed flange 18 and anchor flange 22, the mounting flange 10 can be secured to the countertop 26. Advantageously, because the insert 12 and anchor 14 are screwed to each other, the mounting flange 10 of this disclosure can accommodate many different thicknesses of countertop 26, which prevents installation problems resulting from irregularities in the countertop thickness and allows for one-size-fits-all commercialization of the mounting flange 10. Although the insert 12 and anchor 14 depicted and discussed to this point are secured to one another with threaded surfaces 16*e*, 20*e*, alternative manners of securing the insert 12 to the anchor 14 are contemplated as well.

When used in this manner, mounting flange 10 can be secured to the countertop 26 without need for further steps or alteration of the countertop 26. For example, some prior mounting flanges have been secured to a countertop by drilling holes in the countertop and then connecting the mounting flange to the countertop using fasteners in the drilled holes. This prior configuration required extra steps of drilling holes in the countertop, which can lead to mistakes, including accidental destruction of portions of the countertop. This leads to expensive remedies when using expensive countertop materials such are marble or granite. Additionally, special fasteners or cements are often needed to properly secure other fasteners to the countertop. The insert 12 and anchor 14 of the mounting flange 10 disclosed herein avoid these problems.

Figure 2C:
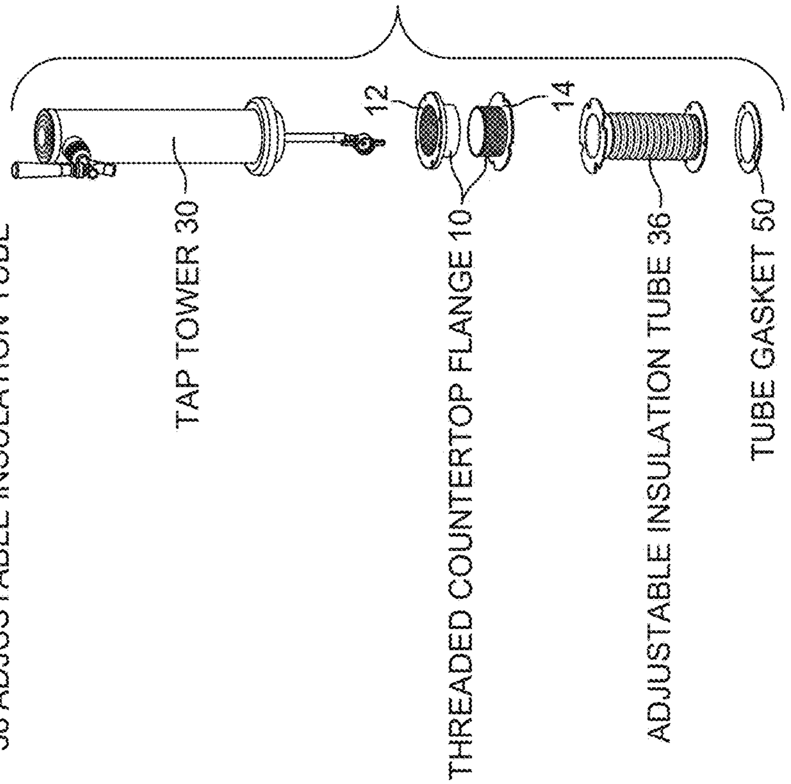
FIG. 2C is an exploded view of the mounting flange and tap tower of FIG. 2A along with an insulation tube and a gasket.
Figure 2A:
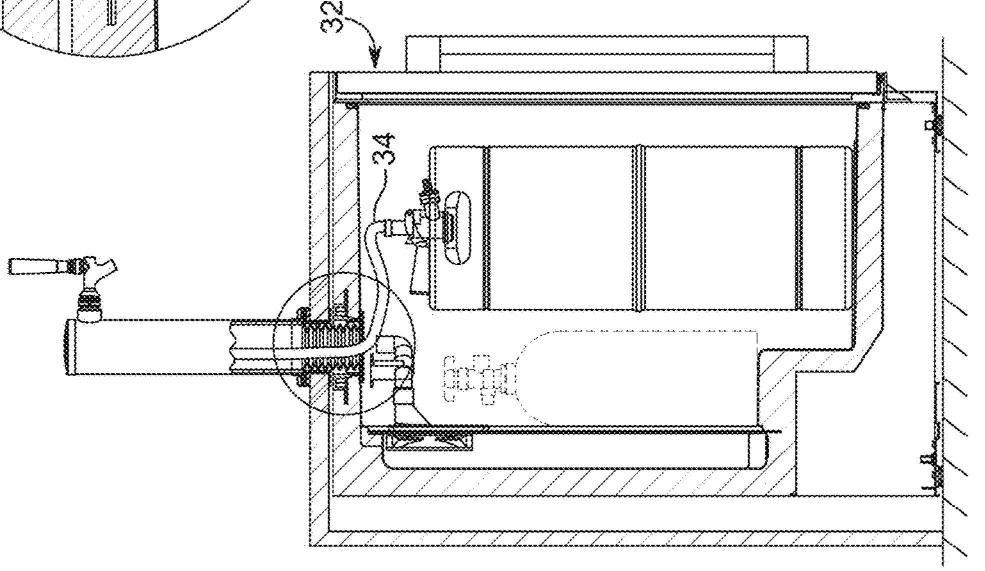
FIG. 2A is a cross-sectional view of a liquid cooling system having a tap tower secured to a countertop with the mounting flange of FIG. 1A.

In one embodiment, mounting holes 28 are defined in the exposed flange 18 of the insert 12. The mounting holes 28 comprise threads to receive hardware such as screws (not depicted) that allow for attachment of other structures to the mounting flange 10 in order to take advantage of the secure and stable connection of the mounting flange 10 to the countertop 26. FIGS. 2A and 2B depict one possible application of this feature in which a tap tower 30 is secured to the mounting flange 10 by inserting screws through the tap tower 30 and threading them into the mounting holes 28 of the insert 12 and advancing those screws until the tap tower 30 is sufficiently pressed against the insert 12, the countertop 26 or other object, to cause the tap tower 30 to be securely and stably mounted with respect to the countertop 26. The mounting flange 10 disclosed herein can be used to secure objects other than tap towers.

Various modifications and alterations from and to the depicted embodiments are contemplated as being within this disclosure. For example, the threads on the insert 12 and anchor 14 can be reversed such that the insert defines male threads and the anchor defines female threads. Additionally, the threads on the insert 12 and anchor 14 could be replaced by other attachment features such as tooth and ratchet. If the attachment features do not require rotation of the insert 12 or anchor 14, then the channel walls need not be cylindrical, as depicted. The insert 12 and anchor 14 can be made of any suitable material including metals or polymers. ABS has been found particularly suitable.

In the application of the mounting flange 10 depicted in FIG. 2A, the tap tower 30 is secured to the countertop 26 in order to allow the tap tower 30 to deliver liquid stored below the countertop 26. In the depicted embodiment, the liquid is stored in a cooler 32 (identified in FIG. 2B as "kegerator") to bring and maintain the temperature of the liquid below ambient temperature. The cooled liquid is transported from the cooler 32 to the tap tower 30 through a transport tube 34 which extends out of the cooler 32, through the mounting flange 10 and countertop 26 and into the tap tower 30. Those portions of the transport tube 34 not located inside the cooler 32 can be subjected to ambient temperatures causing the liquid inside those portions of the transport tube 34 to warm above the desire temperature of the liquid. In the example depicted in FIGS. 2A and 2B, the cooler 32 is located below the countertop 26 and a gap is present between the cooler and the countertop 26. The transport tube 34 passes through that gap.

Figure 4:
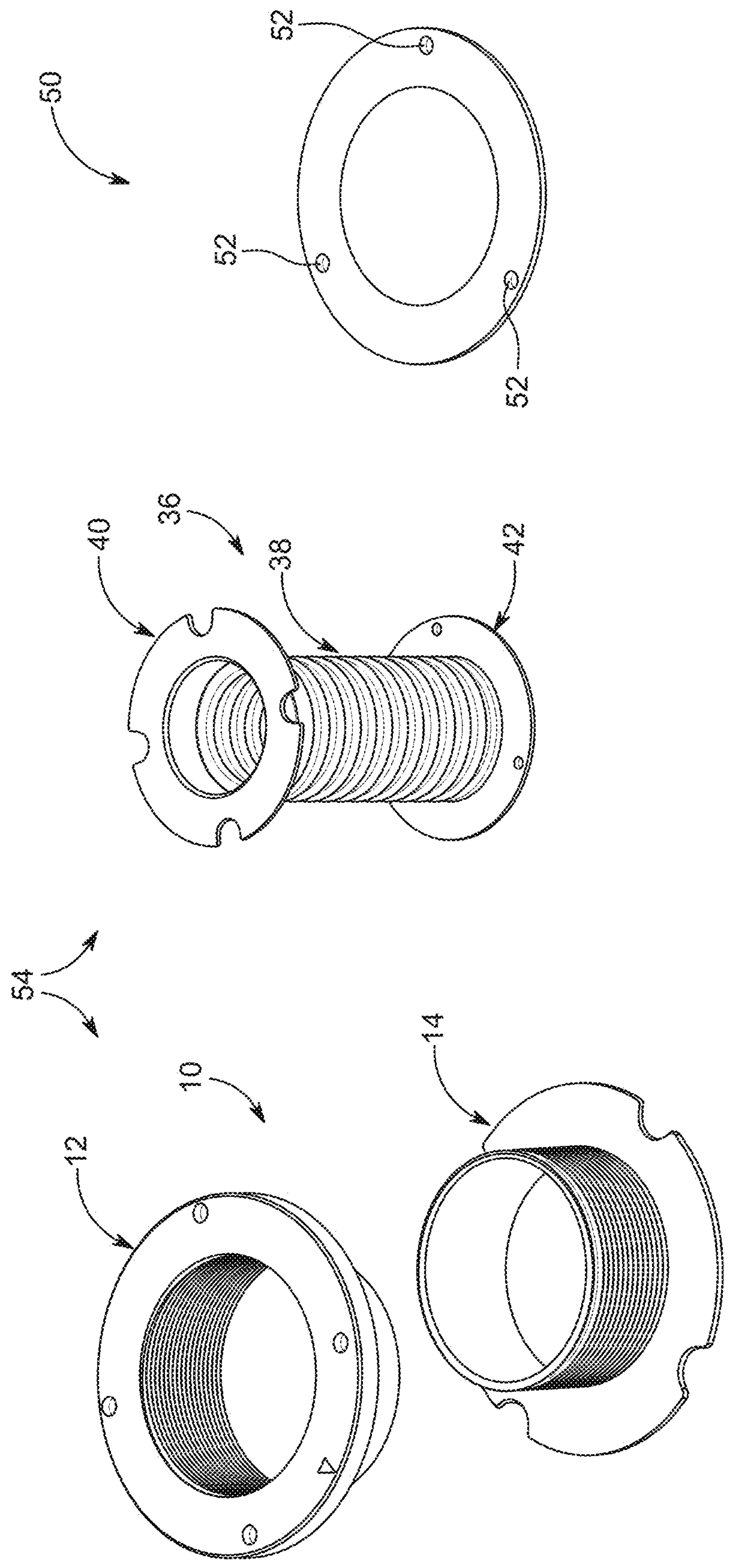
FIG. 4 is a perspective view of an installation kit having the mounting flange of FIGS. 1A and 1B, the insulation tube of FIGS. 3A and 3B and the gasket of FIGS. 2A-2C.

The present disclosure remedies this issue with an insulation tube 36 (identified in FIGS. 2B, 2C and 4 as "Adjustable Insulation Tube") extending across the gap. More specifically, the insulation tube 36 extends between the cooler 32 and the tap tower 30 and surrounds the transport tube 34 to prevent ambient air from contacting the transport tube 34. Moreover, the depicted embodiment shows the diameter of the insulation tube 36 as being significantly larger than the transport tube 34, which leave space around the transport tube 34 for cool air from the cooler to enter the tap tower 30 with sufficient circulation of air. As a result, the liquid delivered from the cooler 32 to the tap tower 30 is much closer to the temperature inside the cooler 32 than would otherwise be achieved.

Figure 3A:
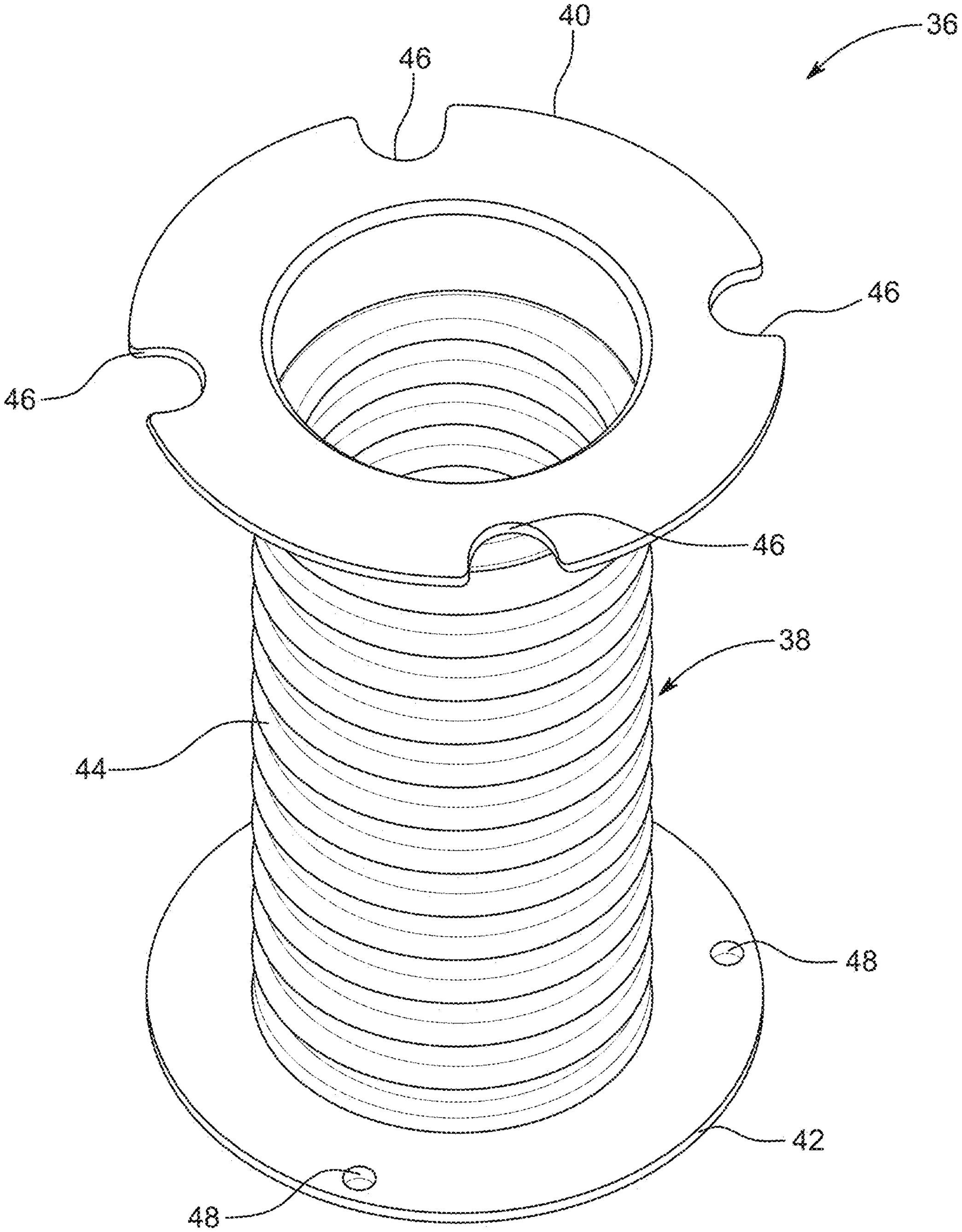
FIG. 3A is a perspective view of the insulation tube of FIGS. 2A-2C.
Figure 3B:
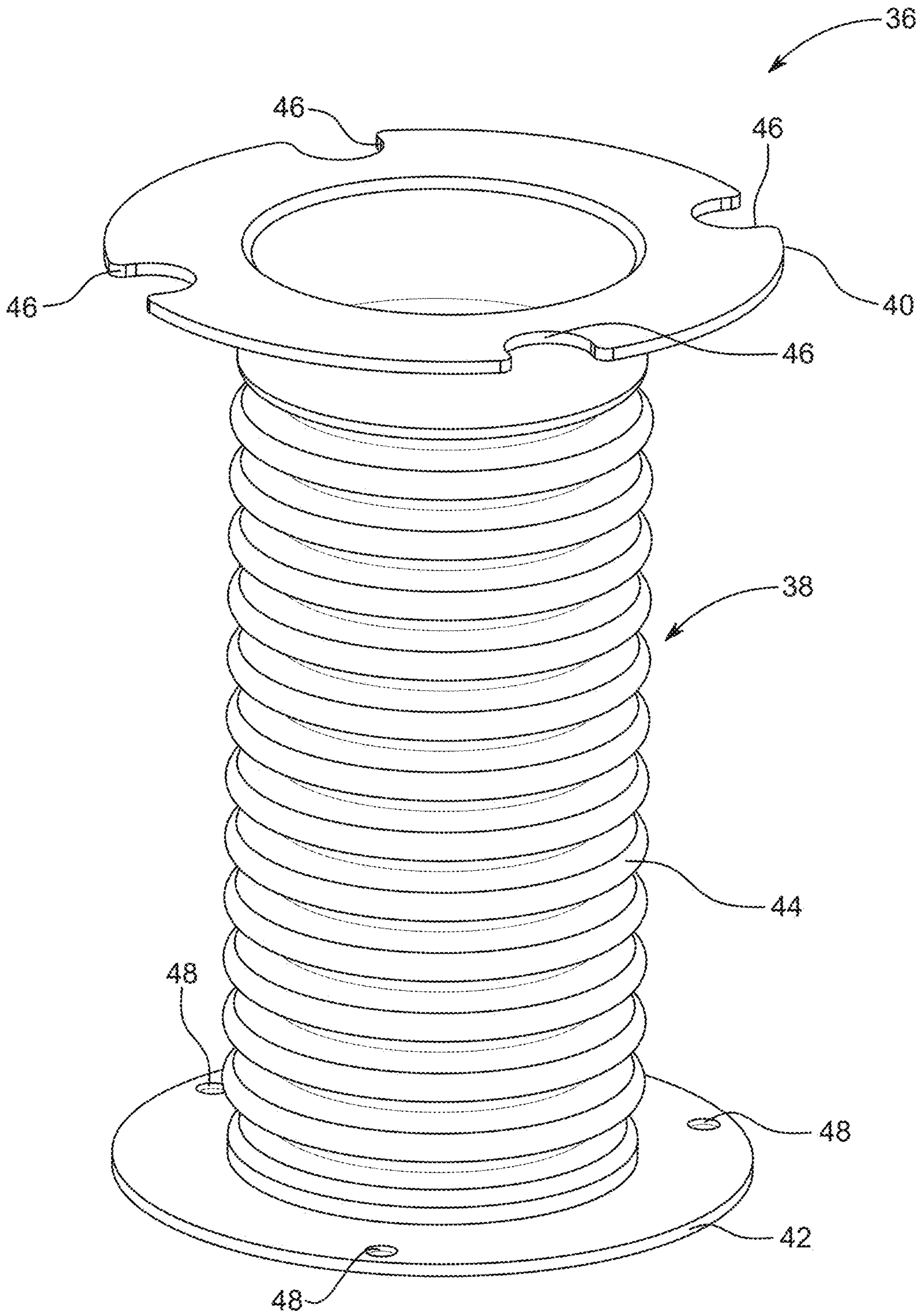
FIG. 3B is a second perspective view of the insulation tube of FIG. 3A.

One embodiment of the insulation tube 36 is depicted in FIGS. 3A and 3B. In the depicted embodiment, the insulation tube 36 has a body 38 extending between an upper flange 40 and a lower flange 42. In the depicted embodiment, the upper flange 40 is placed on the top of the exposed flange 18 of the mounting flange 10 and the lower flange 42 is located inside of the cooler 32 with the body 38 extending therebetween through a wall of the cooler, the countertop 26 and the mounting flange 10. The upper flange 40 of the insulation tube 36 is sufficiently rigid to keep the insulation tube 36 from deforming and being pulled through the mounting flange 10 under normal conditions. Similarly, the lower flange 42 of the insulation tube 36 is sufficiently rigid to keep the insulation tube 36 from deforming and being pulled through the cooler 32 under normal condition.

In the depicted embodiment, the body 38 defines a series of ridges 44 akin to pleated accordion bellows. The accordion-style body 38 provides lateral flexibility to the insulation tube 36 to accommodate misalignment of an aperture in the cooler 32 and the mounting flange 10. The accordion-style body 38 also provides axial flexibility to span different distances due to different countertop thicknesses, different countertop heights, different cooler heights, etc. In one embodiment, the upper flange 40 defines a plurality of indents 46 which may be aligned with the mounting holes 28 of the exposed flange 18 so to avoid the screws or other hardware meant to secure the tap tower 30 to the exposed flange 18. The lower flange 42 can be provided with apertures 48 to facilitate securing of the lower flange 42 to the cooler 32 with screws or other fasteners.

In one embodiment, the body 38 of the insulation tube 36 is constructed of Ethylene Propylene Diene Monomer ("EPDM"), while the upper flange 40 and lower flange 42 are constructed of Acrylonitrile Butadiene Styrene ("ABS"). In another embodiment, the body 38 of the insulation tube 36 is constructed of Styrene Butadiene Rubber ("SBR") and natural rubber ("NR"). Other materials are also contemplated to achieve the objects and benefits discussed herein.

A gasket 50 (identified in FIGS. 2B, 2C and 4 as "tube gasket") is optionally inserted between the insulation tube lower flange 42 and the cooler 32 to assist in providing sufficient seal to prevent air flow therebetween. The gasket 50 can also define apertures 52 aligned with the insulation tube lower flange apertures 48 to facilitate securing of the lower flange 42 to the cooler 32 with screws or other fasteners.

The mounting flange 10 and insulation tube 36 can optionally be combined as a kit 54 to facilitate installation of a cooler 32 and tap tower 30 to a countertop 26. The kit 54 may also optionally include the gasket 50.

It should be noted that the various components and features described above can be combined in a variety of ways, so as to provide other non-illustrated embodiments within the scope of the disclosure. As such, it is to be understood that the disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation.

Although the present disclosure has been described in the foregoing description by way of illustrative embodiments thereof, these embodiments can be modified at will, without departing from the spirit, scope, and nature of the subject disclosed.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. In addition, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a term coupled or the like may refer to being directly coupled. In another aspect, a term coupled or the like may refer to being indirectly coupled. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The use of the terms "a" and "an" and "the" and "said" and similar references in the context of describing the invention (especially in the context of the following claims) are to be construed to cover both the singular and the plural, unless otherwise indicated herein or clearly contradicted by context. An element proceeded by "a," "an," "the," or "said"

does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. A mounting flange for mounting a drink dispensing tower to a countertop defining an aperture, the mounting flange comprising:
- an insert having
  - an exposed flange;
  - an insert channel wall extending from the exposed flange for being positioned in the countertop aperture, the insert channel wall defining an inner surface and an outer surface;
- an anchor having
  - an anchor flange;
  - an anchor channel wall extending from the anchor flange for being positioned in the countertop aperture, the anchor channel wall defining an inner surface and an outer surface;
- wherein one of the inner surface and outer surface of the insert channel wall defines a plurality of teeth and one of the inner surface and outer surface of the anchor channel wall defines a plurality of teeth for threaded engagement with the teeth defined on the insert channel wall such that the threaded engagement is located in the countertop aperture.

2. The mounting flange of claim 1, wherein the exposed flange defines a plurality of mounting holes.

3. The mounting flange of claim 1 further comprising an insulation tube comprising an upper flange, a lower flange and a body extending between the upper flange and the lower flange.

4. The mounting flange of claim 3, wherein the insulation tube body defines a plurality of ridges providing flexibility to the body.

5. The mounting flange of claim 3, wherein the insulation tube body is located inside the anchor channel wall.

6. A mounting kit for mounting a drink dispensing tower to a countertop defining an aperture, the mounting kit comprising:
- an insulation tube; and
- a mounting flange having;
  - an insert having;
    - an exposed flange;
    - an insert channel wall extending from the exposed flange for being positioned in the countertop aperture, the insert channel wall defining an inner surface and an outer surface;
  - an anchor having;
    - an anchor flange;
    - an anchor channel wall extending from the anchor flange for being positioned in the countertop aperture, the anchor channel wall defining an inner surface and an outer surface;
- wherein one of the inner surface and outer surface of the insert channel wall defines a plurality of teeth and one of the inner surface and outer surface of the anchor channel wall defines a plurality of teeth for threaded engagement with the teeth defined on the insert channel wall such that the threaded engagement is located in the countertop aperture.

7. The mounting kit of claim 6, wherein the exposed flange defines a plurality of mounting holes.

8. The mounting kit of claim 6, wherein the insulation tube comprises:
- an upper flange;
- a lower flange; and
- a body extending between the upper flange and the lower flange.

9. The mounting kit of claim 8, wherein the body defines a plurality of ridges providing flexibility to the body.

10. The mounting kit of claim 9, wherein the insulation tube body is located inside the anchor channel wall.

11. The mounting kit of claim 6, further comprising a gasket.

12. A liquid dispensing tower mounting kit comprising:
- a tap tower;
- and
- a mounting flange for mounting the liquid dispensing tower to a countertop defining an aperture, the mounting flange having;
  - an insert having;
    - an exposed flange;
    - an insert channel wall extending from the exposed flange for being positioned in the countertop aperture, the insert channel wall defining an inner surface and an outer surface;
  - an anchor having;
    - an anchor flange;
    - an anchor channel wall extending from the anchor flange for being positioned in the countertop aperture, the anchor channel wall defining an inner surface and an outer surface;
  - wherein one of the inner surface and outer surface of the insert channel wall defines a plurality of teeth and one of the inner surface and outer surface of the anchor channel wall defines a plurality of teeth for threaded engagement with the teeth defined on the insert channel wall such that the threaded engagement is located in the countertop aperture.

13. The liquid dispensing tower mounting kit of claim 12, wherein the exposed flange defines a plurality of mounting holes.

14. The liquid dispensing tower mounting kit of claim 12, further comprising an insulation tube, wherein the insulation tube comprises:
- an upper flange;
- a lower flange; and
- a body extending between the upper flange and the lower flange to extend across a gap between the countertop and an adjacent cooler.

15. The liquid dispensing tower mounting kit of claim 14 wherein the body is axially flexible.

16. The liquid dispensing tower mounting kit of claim 14, wherein the body defines a plurality of ridges providing flexibility to the body.

17. The liquid dispensing tower mounting kit of claim 14, wherein the body is located inside the anchor channel wall.

18. The liquid dispensing tower mounting kit of claim 12, further comprising a gasket.

* * * * *